United States Patent [19]
Eswarakrishnan et al.

[11] Patent Number: 5,356,529
[45] Date of Patent: Oct. 18, 1994

[54] ELECTRODEPOSITABLE COMPOSITIONS CONTAINING TRIORGANOTIN CATALYSTS

[75] Inventors: V. Eswarakrishnan; Robert R. Zwack, both of Allison Park; Edward R. Coleridge, Lower Burrell, all of Pa.

[73] Assignee: PPG Industries, Inc., Pittsburgh, Pa.

[21] Appl. No.: 57,368

[22] Filed: May 3, 1993

[51] Int. Cl.$^5$ .................. C25D 13/06; C08G 18/00
[52] U.S. Cl. .................. 205/224; 205/159; 205/229; 205/317; 528/45; 528/58; 524/901
[58] Field of Search .............. 524/901; 427/327, 384; 528/45, 58; 205/224, 159, 229, 317

[56] References Cited

U.S. PATENT DOCUMENTS

| | | | |
|---|---|---|---|
| 4,256,621 | 3/1981 | Shimokai et al. | 524/901 |
| 4,865,704 | 9/1989 | Saatweber et al. | 523/404 |
| 4,968,823 | 11/1990 | Kiyama et al. | 556/88 |
| 4,981,924 | 1/1991 | Nichols et al. | 525/528 |
| 5,063,269 | 11/1991 | Hung | 524/296 |
| 5,089,583 | 2/1992 | Nichols et al. | 528/58 |
| 5,115,070 | 5/1992 | Harris et al. | 528/59 |

*Primary Examiner*—John Kight, III
*Assistant Examiner*—Jeffrey Culpeper Mullis
*Attorney, Agent, or Firm*—William J. Uhl

[57] ABSTRACT

Electrodepositable compositions comprising active hydrogen-containing ionic resins, capped polyisocyanate curing agents and triorganotin catalysts are disclosed. The catalysts are liquid, can be easily incorporated into the electrodepositable compositions and surprisingly exhibit good catalytic activity at low levels.

7 Claims, No Drawings

ELECTRODEPOSITABLE COMPOSITIONS CONTAINING TRIORGANOTIN CATALYSTS

FIELD OF THE INVENTION

The present invention relates to electrodepositable compositions containing active hydrogen-containing ionic resins, capped polyisocyanate curing agents and organotin catalysts and to the use of these compositions in the electrodeposition process.

BACKGROUND OF THE INVENTION

Electrodepositable compositions containing active hydrogen-containing ionic resins and capped polyisocyanate curing agents are well known in the art. For example, U.S. Pat. No. 4,031,050 discloses cationic resins which are prepared from reacting polyepoxide-containing polymers with primary and/or secondary amines and neutralizing the resulting reaction product with acid to form cationic salt group-containing polymers. The capped polyisocyanate curing agents for these polymers are polyisocyanates such as toluene diisocyanate (TDI) and 4,4'-diphenylmethane diisocyanate (MDI) alone or in admixture with other isomeric and analogous higher polyisocyanates (crude MDI).

To catalyze the curing reaction, an organotin catalyst such as dibutyltin oxide is usually present in the composition. Although effective as a catalyst, the dialkyltin compounds have certain shortcomings associated with them. They are solid materials at room temperature and are difficult to incorporate into the electrodepositable compositions. They are usually milled with a dispersing vehicle to form a catalyst paste and the paste added to the electrodepositable composition. The milling operation requires additional time, labor, equipment and adds to the cost of preparing the electrodepositable composition. Also, organotin compounds are expensive materials and somewhat toxic and can present environmental problems when used as a catalyst in the electrodeposition process. The materials can volatilize during curing and are often found in the ultrafiltration effluent. When attempts were made to minimize these problems by lowering the amount of dialkyltin catalyst in the electrocoating composition, the cured electrodeposited coating which resulted had poor cured coating properties and poor appearance.

PRIOR ART

It is known in the art, for example, from U.S. Pat. Nos. 4,981,924 and 5,089,583 that certain diorganotin compounds such as the bismercaptides, biscarboxylates and certain heterocyclic diorganotin compounds are effective as catalysts in electrodepositable compositions containing active hydrogen-containing ionic resins and capped polyisocyanate curing agents. These diorganotin compounds are liquids and although they can be easily incorporated into the electrodepositable compositions, they are volatile and have not been found to be any more effective catalytically than comparable solid dialkyltin catalysts such as dibutyltin oxide. Attempts to use lower levels of these liquid catalysts results in poor surface appearance.

U.S. Pat. No. 5,063,269 discloses adhesive compositions containing polymerizable ethylenically unsaturated urethane polymers. The urethane polymers may be prepared by reacting polyisocyanates with unsaturated hydroxyl functional reactants optionally in the presence of additional active hydrogen-containing compounds. Preferably, a catalyst may be present such as a tin catalyst including diorganotin catalyst such as those mentioned above as well as trialkyltin oxide.

U.S. Pat. No. 5,115,070 discloses certain so-called polyahls comprising a backbone having at least one acyclic moiety selected from the group consisting of urea, biuret, thiourea, dithiobiuret, amide and thioamide, and at least two polyalkylene oxide moieties and at least one terminal hydroxyl carbamate group. The polyahls containing hydroxyl and/or amine end groups may be reacted with an excess of isocyanate to form an isocyanate functional prepolymer. A catalyst may be used in the preparation of the prepolymer such as an organotin catalyst, specifically, a diorganotin catalyst such as those mentioned above and a trialkyltin oxide.

Although both U.S. Pat. Nos. 5,063,269 and 5,115,070 suggest the use of trialkyltin oxide, among many other catalysts for reacting an isocyanate with a polyol to form a polyurethane, there is no suggestion in these references of using the trialkyltin oxides as a catalyst in a curing reaction of an active hydrogen-containing ionic resin and a capped polyisocyanate curing agent, nor is there any suggestion in these references of the particularly beneficial effect of these catalysts in bringing about cure at low catalyst levels.

U.S. Pat. No. 4,968,823 discloses a process for the preparation of alkyltin oxides. The reference mentions that although both diorgano and triorganotin compounds are known, diorganotin compounds are known for use as catalysts for electrodeposition coatings and triorganotin compounds are known for use in anti-fouling paints. There is no suggestion that triorganotin compounds would also be useful as catalysts for electrodeposition coatings.

SUMMARY OF THE INVENTION

The present invention provides an improved electrodepositable composition comprising an active hydrogen-containing ionic resin and a capped polyisocyanate curing agent and an organotin catalyst. The improvement of the invention resides in the organotin catalyst which is a triorganotin preferably of the following structural formula:

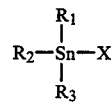

where X is O- and $R_1$, $R_2$ and $R_3$ are alkyl.

DETAILED DESCRIPTION

In connection with the above structural formula, $R_1$, $R_2$ and $R_3$ can be the same or different and besides alkyl can be aryl such as phenyl, and substituted alkyl and aryl in which the substituents do not adversely affect the curing reaction such as alkaryl such as tolyl and aralkyl such as benzyl. Preferably, $R_1$, $R_2$ and $R_3$ are alkyl groups more preferably containing from 1 to 20, and most preferably 1 to 10 carbon atoms, such as butyl. Preferably, the organotin compound of the present invention is of the structure:

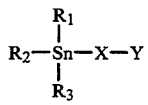

where X is O and Y is H or more preferably

where $R_1$, $R_2$ and $R_3$ are as described above. Specific examples of triorganotin compounds are bistributyltin oxide and bistrioctyltin oxide.

The organotin compounds of the present invention are present in the electrodepositable compositions in amounts of 0.01 to 1.5, preferably 0.025 to 0.25 percent by weight tin based on weight of resin solids. Somewhat surprisingly, the organotin compounds of the present invention have good catalytic activity at relatively low levels compared to the diorganotin compounds such as dibutyltin oxide. Amounts as low as 0.01 percent by weight tin can be used with good cure response and coating appearance, whereas dibutyltin oxide must be used in minimum amounts of 0.3–0.5 percent by weight tin to achieve comparative properties.

The organotin compounds of the present invention are liquids at room temperature and can be easily incorporated into the electrodepositable composition. Typically, the triorganotin compounds are simply added and stirred into the active hydrogen resin prior to its neutralization. Alternately, triorganotin compounds can be blended or reacted with other resinous ingredients or blended with organic solvents which are incorporated into the electrodepositable composition.

Besides the organotin compounds, the electrodepositable compositions comprise an active hydrogen-containing ionic resin and a capped polyisocyanate curing agent.

The active hydrogen-containing ionic resins include both anionic resins and cationic resins with the cationic resins being preferred because they usually provide superior corrosion resistance. The active hydrogens associated with the ionic resins are those which are reactive with isocyanate groups and include hydroxyl, primary amino, secondary amino and thiol groups, including mixtures thereof. The active hydrogens are reactive with blocked isocyanate groups resulting in a curing reaction when the coating compositions are heated. Particularly preferred active hydrogen group containing ionic resins are cationic resins which contain amine salt groups such as the acid-solubilized reaction products of polyepoxides and primary or secondary amines as described in U.S. Pat. Nos. 3,663,389; 3,922,253; 3,984,299; 3,947,388; 3,947,339 and 4,031,050.

Besides the epoxy-amine reaction products, active hydrogen-containing ionic resins can also be selected from cationic acrylic resins such as those described in U.S. Pat. Nos. 3,455,806 and 3,928,157. Further active hydrogen-containing ionic resins can be selected from cationic polyester resins, and the like, which contain ionic groups and active hydrogen groups.

Besides resins containing amine salt groups, resins containing quaternary ammonium salt groups can also be employed. Examples of these resins are those which are formed from reacting an organic polyepoxide with a tertiary amine salt. Such resins are described in U.S. Pat. Nos. 3,962,165; 3,975,346; 4,001,101 and 4,101,486. Examples of other cationic resins are ternary sulfonium salt group-containing resins and quaternary phosphonium salt group-containing resins such as those described in U.S. Pat. Nos. 3,793,278 and 3,984,922, respectively.

Preferred cationic resins are those which contain primary and/or secondary amine groups. Such resins are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetramine and the excess polyamine vacuum stripped from the reaction mixture. Such products are described in U.S. Pat. Nos. 3,663,389 and 4,116,900.

Modified resins such as those obtained by chain extending the polyepoxide to increase its molecular weight are also preferred in the practice of the invention. Such materials are described in U.S. Pat. No. 4,148,772 in which the polyepoxide is chain extended with a polyester polyol and in U.S. Pat. No. 4,468,307 in which the polyepoxide is chain extended with a particular polyether polyol. Also, chain extension methods such as those disclosed in Canadian Patent 1,179,443 can be used.

The epoxy polymers which are used in preparing the cationic resins are polyepoxides, that is, polymers having an epoxy equivalency greater than 1, preferably about 2 or more. Preferred are polyepoxides which contain 1,2-epoxide groups and which are difunctional with regard to epoxy. The preferred polyepoxides are polyglycidyl ethers of cyclic polyols. Particularly preferred are polyglycidyl ethers of polyphenols such as bisphenol A.

Besides the polyglycidyl ethers of polyphenols, epoxy-containing polymers which can be used are acrylic polymers which contain epoxy groups. These polymers are formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156.

The capped isocyanates which may be employed in the compositions of the invention may be any isocyanate where the isocyanato groups have been reacted with a compound so that the resultant capped isocyanate is stable to active hydrogens at room temperature but reactive with active hydrogens at elevated temperature, usually between about 90°–200° C.

In the capped organic polyisocyanate, any suitable organic polyisocyanate such as aliphatic and aromatic polyisocyanates can be used. Representative examples of the aliphatic polyisocyanates are trimethylene, tetramethylene, tetramethylxylylene, pentamethylene, hexamethylene, 1,2-propylene, 1,2-burylens, 2,3-burylens, and 1,3-butylene diisocyanates. Also suitable are the cycloalkylene compounds such as 1,3-cyclopentane, 1,4-cyclohexane, 1,2-cyclohexane and isophorone diisocyanates. Representative examples of the aromatic polyisocyanates are m-phenylene, p-phenylene, 4,4- diphenyl, 1,5-naphthalene and 1,4-naphthalene diisocyanates and diphenylmethane-4,4-diisocyanate (MDI), polymeric diphenylmethane-4,4-diisocyanate (crude MDI); the aliphatic-aromatic compounds such as 2,4- or 2,6-tolylene diisocyanates, or mixtures thereof, 4,4-toluidine, and 1,4-xylylene diisocyanates; the nuclear-substituted aromatic compounds such as dianisidine diisocyanate, 4,4-diphenylether diisocyanate and chlorodiphenylene diisocyanate; the triisocyanates such as triphenylmethane-4,4,4-triisocyanate, 1,3,5-triisocyanatobenzene and 2,4,6-triisocyanatotoluene; the tetraisocyanates such as 4,4-dimethyldiphenylmethane-2,2,5,5-tetraisocyanate; the polymerized polyisocyanates such as tolylene dtisocyanate dimers and trimers, and the like.

In addition, the isocyanates can be prepolymers derived from polyols including polyether polyol or polyester polyol, including polyols which are reacted with excess polyisocyanates to form isocyanate-terminated prepolymers. These may be simple polyols such as glycols, for example, ethylene glycol and propylene glycol, as well as other polyols such as glycerol, trimethylolpropane, hexanetriol, pentaerythritol, and the like, as well as ether-alcohols such as diethylene glycol, tripropylene glycol and the like and polyethers, that is, alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of approximately 1540, polyoxypropylene glycol having a molecular weight of approximately 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trtmethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

The capping agent of the capped isocyanate groups can be an alcohol, including glycol monoethers and amino alcohols. Examples include aliphatic alcohols such as methanol and 2-ethylhexyl alcohol; cycloaliphatic alcohols such as cyclohexanol; aromatic alkyl alcohols such as benzyl alcohol; glycol monoethers such as the monoalkyl ethers of ethylene glycol, i.e. the monobutyl ether of diethylene glycol; and amino alcohols such as dimethylethanolamine. Oximes such as methyl ethyl ketoxime; lactams such as epsilon-caprolactam; aliphatic amines such as dibutylamine and beta-dicarbonyl compounds such as acetyl acetone can also be used.

The capped polyisocyanate curing agent can be used in two similar ways. The polyisocyanate can be fully capped, that is, no free isocyanate groups remain, and then added to the active hydrogen-containing ionic resin to form a two-component system. Or, the polyisocyanate can be partially capped, for example, half-capped diisocyanate so that the reactive isocyanate groups remain. The partially capped isocyanate can then be reacted with a portion of the active hydrogen groups, i.e., hydroxyl groups, under conditions which will not uncap the capped isocyanate group. This reaction in effect fully caps the isocyanate making it a part of the resin molecule and a one-component system.

Usually, the reaction of the semi-capped polyisocyanate and the active hydrogen functionality in the resin is conducted at low or moderate temperature which is generally about 150° C. or less to preserve the capped isocyanate groups in order to avoid gelation and to retain latent crosslinking sites. Solvent, particularly a water-miscible one such as an ether, ester or ketone, may be used. Whether partially capped or fully capped, sufficient polyisocyanate is present in the coating system so that there are about 0.1 to 1.0 capped isocyanate groups for each active hydrogen.

Besides capped polyisocyanates which are prepared by reacting an organic polyisocyanate with a capping agent as described above, capped polyisocyanates which are formed by reacting a carbonate such as ethylene or propylene carbonate with a polyamine can also be used.

The active hydrogen-containing ionic resin is present in the electrodepositable composition in amounts of about 20 to 90 percent, preferably 30 to 70 percent based on the weight of resin solids present in the electrodepositable composition. Accordingly, the amount of capped polyisocyanate is from 5 to 75 percent, preferably 20 to 60 percent based on the weight of resin solids present in the electrodepositable coating composition.

The electrodepositable compositions of the present invention are in the form of aqueous dispersions The term "dispersion" refers to a two-phase transparent, translucent or opaque resinous system in which the resin is in the dispersed phase and the water is in the continuous phase. The average particle size of the resinous phase is generally less than 10 and usually less than 5 microns, preferably less than 0.5 microns. The concentration of the resinous phase in the aqueous medium is usually at least 1 percent and usually from about 2 to 60 percent by weight based on weight of the aqueous dispersion. When the compositions of the present invention are in the form of resin concentrates, they generally have a resin solids content of about 25 to 60 percent by weight based on the weight of the aqueous dispersion. When the compositions of the present invention are in the form of electrodepositable coating compositions, the resin solids content of the composition is usually within the range of about 5 to 25 percent by weight based on weight of the electrodepositable coating composition.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and 25 percent, and when used, preferably from about 0.05 to about 5 percent by weight based on the weight of the electrodepositable coating composition.

In some instances, a pigment composition and if desired, various additives such as surfactants, wetting agents or catalysts are included in the dispersion. The pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the present invention, the pigment-to-resin ratio is usually within the range of 0.02:1 to 1:1. The other additives mentioned above are usually in the dispersion in amounts of about 0.01 to 3 percent by weight based on the total solids weight of electrodepositable resins present in the electrodepositable coating composition.

When the electrodepositable coating composition described above is employed for use in electrodeposition, the coating composition is placed in contact with an electrically conductive anode and an electrically conductive cathode with the surface to be coated being the either the cathode or the anode, depending on whether the ionic active hydrogen-containing resin is anionic or cationic; preferably the electrode to be coated is the cathode. Following contact with the coating composition, an adherent film is deposited on one electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically is between 50 and 500 volts. The current density is usually between 0.5 and 5 amperes per square foot and tends to decrease during electrodeposition indicating the formation of an insulating film. The coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures for example at 90°–260° C. for 1 to 40 minutes.

Illustrating the invention are the following examples which, however, are not to be considered as limiting the invention to their details. All parts and percentages in the examples as well as throughout the specification are by weight unless otherwise indicated. Parts by weight are in grams unless otherwise indicated.

EXAMPLES

The following examples show the preparation of various electrodepositable compositions containing high and low levels of liquid triorganotin compounds specifically bistributyltin oxide and for comparative purposes high and low levels of solid diorganotin compounds specifically dibutyltin oxide. The electrodepositable compositions were electrodeposited onto steel panels, cured and the cured coatings evaluated for corrosion resistance and appearance.

EXAMPLES A–C

Examples A, B and C show the preparation of active hydrogen-containing ionic resins and capped polyisocyanate curing agents. Example A contained a relatively high level of triorganotin compound and Example B contained a relatively low level of triorganotin compound. Example C contained no organotin compound and was for the purpose of comparison. Dibutyltin oxide was subsequently added to the resin of Example C.

Example A

A resinous composition containing a cationic resin, a capped polyisocyanate curing agent and a liquid triorganotin catalyst was prepared from the following ingredients:

| Ingredients | Parts by Weight |
| --- | --- |
| EPON 828 | 453 |
| Bisphenol A-ethylene oxide adduct (1/6 molar ratio) | 162.7 |
| Bisphenol A | 132.2 |
| Methyl isobutyl ketone | 39.4 |
| Benzyldimethylamine | 0.6 |
| Benzyldimethylamine | 1.9 |
| Crosslinker[1] | 790.8 |
| Diketimine[2] | 49.9 |
| N-methylethanolamine | 43.7 |
| Bistributyltin oxide | 24.8 |

[1]The capped polyisocyanate crosslinker was prepared from the following mixture of ingredients:

| Ingredients | Parts by Weight |
| --- | --- |
| Polyisocyanate[a] | 4095 |
| Methyl isobutyl ketone | 2199.6 |
| Dibutyltin dilaurate | 6.2 |
| 2-(2-Butoxyethoxy)ethanol | 3353 |
| Trimethylolpropane | 356.1 |
| 2-(2-Butoxyethoxy)ethanol | 464.2 |

[a]Polymeric MDI available from Mobay Chemical Company as MONDUR MRS-4. The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60 to 65° C. Upon completion of the addition, the reaction mixture was held at 65° C. for 90 minutes. The trimethylolpropane was then added and held there for three hours whereupon the final portion of the 2-(2-butoxyethoxy)ethanol was added. The 110° C. hold was continued until infrared analysis indicated no unreacted NCO remained.

[2]Diketimine derived from diethylenetriamine and methyl isobutyl ketone (73 percent solids in methyl isobutyl ketone).

The EPON 828 (diglycidyl ether of bisphenol A from Shell Chemical Co.), bisphenol A-ethylene oxide adduct, bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C. held for ½ hour, cooled further to 145° C. and the second portion of benzyldimethylamine added. The reaction was held at 145° C. until a reduced Gardner-Holdt viscosity (50 percent resin solids in 2-methoxypropanol) of R-S was obtained. At this point, the crosslinker, the diketimine and N-methylethanolamine were added in succession. The mixture was allowed to exotherm and then a temperature of 125° C. was established. After one hour at 125° C., the mixture was cooled to 100° C. and the bistributyltin oxide was added to the mixture and the mixture allowed to mix for 15 minutes at 100° C.

The resin mixture (1440 parts) was dispersed in aqueous medium by adding it to a mixture of 35.1 parts of sulfamic acid and 803 parts of deionized water. The dispersion was further thinned with 506 parts of deionized water and 796 parts of deionized water in stages and vacuum stripped to remove organic solvent to give a dispersion having a solids content of 36.0 percent and a particle size of 827 Angstroms.

Example B

A resinous composition similar to Example A but containing a lower level of the triorganotin catalyst was prepared from the following ingredients:

| Ingredients | Parts by Weight |
| --- | --- |
| EPON 828 | 453 |
| Bisphenol A-ethylene oxide adduct (1/6 molar ratio) | 162.7 |
| Bisphenol A | 132.2 |
| Methyl isobutyl ketone | 39.4 |
| Benzyldimethylamine | 0.6 |
| Benzyldimethylamine | 1.9 |
| Crosslinker of Example A | 791.6 |
| Diketimine of Example A | 52.5 |
| N-methylethanolamine | 43.7 |
| Bistributyltin oxide | 10.3 |

The resinous mixture prior to dispersion was prepared as described in Example A. The resin mixture (1400 parts) was dispersed in aqueous medium by adding it to a mixture of 34.6 parts of sulfamic acid and 778 parts of deionized water. The dispersion was further thinned with 491 parts of deionized water and 773 parts of deionized water in stages and vacuum stripped to remove organic solvent to give a dispersion having a solids content of 38.5 percent and a particle size of 841 Angstroms.

Example C (Comparative)

A resinous composition similar to Examples A and B but containing no organotin catalyst was prepared from the following ingredients:

| Ingredients | Parts by Weight |
| --- | --- |
| EPON 828 | 1019.25 |
| Bisphenol A-ethylene oxide 1/6 | 366.08 |
| Bisphenol A | 297.45 |
| Methyl isobutyl ketone | 88.65 |
| Benzyldimethylamine | 1.44 |
| Benzyldimethylamine | 4.28 |
| Crosslinker of Example A | 1779.19 |
| Diketimine of Example A | 112.28 |
| N-methylethanolamine | 98.42 |
| Sulfamic acid | 92.99 |
| Deionized water | 2167.23 |
| Deionized water | 1359.95 |
| Deionized water | 2137.07 |

The resinous mixture was prepared as generally described in Example A until a reduced Gardner-Holdt viscosity of P+ was attained at which point the crosslinker, diketimine and N-methylethanolamine were added in succession. The reaction was then completed during a hold of one hour at 125° C. The mixture was then dispersed by pouring it into an agitated mixture of sulfamic acid and the first portion of deionized water. The dispersion was further thinned in stages with the second and third portions of deionized water and vacuum stripped to remove organic solvent, yielding a final dispersion of 38.4 percent solids and a particle size of 963 Angstroms.

EXAMPLES D-G

These Examples make reference to a flexibilizer-flow control agent, pigment grinding vehicle, pigment paste and dibutyltin oxide catalyst paste, respectively. These materials were prepared for use in the formulation of electrodepositable compositions in Examples 1-4 which follow.

Example D

An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flow control agent-flexibilizer was dispersed in aqueous medium with the aid of lactic acid and the dispersion had a resin solids content of 35.2 percent.

EXAMPLE E

A pigment grinding vehicle was prepared by first preparing a quaternizing agent followed by reacting the quaternizing agent with an epoxy resin. The quaternizing agent was prepared as follows:

| Ingredients | Parts by Weight (grams) | Solids |
| --- | --- | --- |
| 2-Ethylhexanol half-capped toluene diisocyanate in methyl isobutyl ketone | 320 | 304 |
| Dimethylethanolamine | 81.2 | 87.2 |
| Aqueous lactic acid solution | 117.6 | 58.2 |
| 2-Butoxyethanol | 39.2 | |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

The pigment grinding vehicle was prepared as follows:

| Ingredients | Parts by Weight (grams) | Solids |
| --- | --- | --- |
| EPON 829 | 710 | 682 |
| Bisphenol A | 289.60 | 289.6 |
| 2-Ethylhexanol monourethane of 2,4-toluene diisocyanate in methyl isobutyl ketone | 406 | 386.10 |
| Quaternizing agent as described above | 496.3 | 421.9 |
| Deionized water | 71.2 | |
| 2-Butoxyethanol | 1490 | |

The EPON 829 (diglycidyl ether of bisphenol A from Shell Chemical Co.) and bisphenol A were charged under a nitrogen atmosphere to a suitable reaction vessel and heated to 150° to 160° C. to initiate an exotherm. The reaction mixture was permitted to exotherm for one hour at 150° to 160° C. The reaction mixture was then cooled to 120° C. and the 2-ethylhexanol half-capped toluene diisocyanate added. The temperature of the reaction mixture was held at 110° to 120° C. for one hour followed by the addition of the 2-butoxyethanol. The reaction mixture was then cooled to 85° to 90° C., homogenized and then charged with water followed by the addition of the quaternizing agent. The temperature of the reaction mixture was held at 80° to 85° C. until an acid value of about 1 was obtained.

Example F

A pigment paste was prepared from the following mixture of ingredients:

| Ingredients | Parts by Weight |
| --- | --- |
| Pigment grinding vehicle of Example E | 662.8 |
| Deionized water | 1256.0 |
| Titanium dioxide | 1129.2 |
| Carbon black | 55.8 |
| Clay | 658.8 |
| Basic lead silicate | 237.4 |

The ingredients were milled in a sand mill to a Hegman gauge reading of 7+.

Example G

A dibutyltin oxide catalyst was prepared from the following ingredients:

| Ingredients | Parts by Weight (grams) |
| --- | --- |
| Pigment grinding vehicle of Example E | 145 |
| Dibutyltin oxide | 200 |
| Deionized water | 264.8 |

The above ingredients were ground in a mill to a Hegman No. 7 grind.

EXAMPLES 1–4

Examples 1–4 are of various electrodepositable compositions. Examples 1 and 3 are comparative examples containing dibutyltin oxide catalyst. Examples 2 and are examples of the invention containing bistributyltin oxide catalyst.

Example 1 (Comparative)

An electrodepositable composition containing dibutyltin oxide was prepared by mixing together the following ingredients:

| Ingredients | | Parts by Weight |
| --- | --- | --- |
| Resin of Example C | | 1587.4 |
| PARAPLEX WP-1[1] | | 41.6 |
| Resin of Example D | premixed well | 118.2 |
| Deionized water | | 88.8 |
| Paste of Example F | | 233.5 |
| Paste of Example G | | 26.4 |
| Deionized water | | 1730.5 |

[1]Plasticizer available from Rohm and Haas Company.

The 22 percent solids composition which contained a relatively high tin level, i.e., 0.57 percent by weight tin based on weight of resin solids, was ultrafiltered with 20 percent by weight of the composition being replaced with aleionized water. Zinc phosphated steel panels were cathodically electrodeposited in the composition at 1.2 mils thickness. The coated panel was cured at 325° F. (163° C.) for 30 minutes. The cured coating was smooth, uniform and had good solvent resistance. The coated panels were subjected to corrosion testing according to General Motors Test Method 54-26 (Scab Corrosion Creepbacks of Paint Systems on Metal Substrates). Basically, the test measures loss of paint, adhesion and corrosion of the base metal from a scribe line and the edges of the coated steel panel after exposure to repeated cycles of immersion in a salt solution, dry off, and humidity exposure. After 25 cycles, the coated panels are examined for corrosion creepback from the scribe line and edges. Results are reported with a value of 0-10 with 10 evidencing no corrosion and 0 evidencing extensive corrosion. Good results were obtained as shown in Table I below.

EXAMPLE 2

An electrodepositable composition of the invention containing bistributyltin oxide was prepared by mixing together the following ingredients:

| Ingredients | | Parts by Weight |
| --- | --- | --- |
| Resin of Example A | | 1693.3 |
| PARAPLEX WP-1 | | 41.6 |
| Resin of Example D | premixed well | 118.2 |
| Deionized water | | 88.8 |
| Paste of Example F | | 233.5 |
| Deionized water | | 1624.6 |

The 22 percent solids composition which contained a relatively high tin level, i.e., 0.57 percent by weight tin based on weight of resin solids, was ultrafiltered as described in Example 1. When zinc phosphated steel panels were electrodeposited and cured as described in Example 1, smooth, uniform coatings with good solvent resistance were obtained. When the coated panels were subjected to corrosion testing as described in Example 1, very good results were obtained as shown in Table I below.

Example 3 (Comparative)

An electrocoating composition containing dibutyltin oxide was prepared by mixing together the following ingredients:

| Ingredients | | Parts by Weight |
| --- | --- | --- |
| Resin of Example C | | 1587.4 |
| PARAPLEX WP-1 | | 41.6 |
| Resin of Example D | premixed well | 118.2 |
| Deionized water | | 88.8 |
| Paste of Example F | | 233.5 |
| Paste of Example G | | 10.9 |
| Deionized water | | 1730.4 |

The 22 percent solids composition which contained a relatively low tin level, i.e., 0.24 percent by weight tin based on weight of resin solids, was ultrafiltered as described in Example 1. When zinc phosphated steel panels were electrodeposited and baked as described in Example 1, coatings which were poor in appearance with a fuzzy bristle-like look resulted. The coatings also had poor solvent resistance indicating incomplete cure. Poor cure was also evidenced by the corrosion testing results which were poor when testing was conducted as described in Example 1. The results are reported in Table I below.

Example 4

An electrodepositable composition of the invention containing bistributyltin oxide was prepared by mixing together the following ingredients:

| Ingredients | | Parts by Weight |
| --- | --- | --- |
| Resin of Example B | | 1587.5 |
| PARAPLEX WP-1 | | 41.6 |
| Resin of Example D | premixed well | 118.2 |
| Deionized water | | 88.8 |
| Paste of Example F | | 217.0 |

-continued

| Ingredients | Parts by Weight |
|---|---|
| Deionized water | 1746.9 |

The 22 percent solids composition which contained a relatively low tin level, i.e., 0.24 percent by weight tin based on weight of resin solids, was ultrafiltered as described in Example 1. When zinc phosphated steel panels were electrodeposited and cured as described in Example 1, smooth, uniform coatings with good solvent resistance were obtained. When the cured panels were subjected to corrosion testing as described in Example 1, good results were obtained as shown in Table I below.

TABLE I

Coating Evaluation Examples 1-4

| Example Number | Tin Identity and Level (% Tin Based on Weight of Resin Solids) | Appearance | Solvent Resistance | Corrosion Resistance (0-10 with 10 showing no corrosion and 0 showing extensive corrosion) |
|---|---|---|---|---|
| 1 | Dibutyltin oxide (0.57) | good | good | 4 |
| 2 | Bistributyltin oxide (0.57) | good | good | 6 |
| 3 | Dibutyltin oxide (0.24) | poor | poor | 0 |
| 4 | Bistributyltin oxide (0.24) | good | good | 4 |

From the results in Table I above, it can be seen that the bistributyltin oxide is a more effective catalyst than the dibutyltin oxide at the same tin levels. In addition, bistributyltin oxide was catalytically effective at relatively low levels of tin without sacrificing good cure properties. Dibutyltin oxide, on the other hand, was not catalytically effective at these low levels.

We claim:

1. An electrodepositable composition comprising an active hydrogen-containing ionic resin, a capped polyisocyanate curing agent and which contains as an organotin catalyst from 0.025 to 0.25 percent by weight of tin based on weight of resin solids of a triorganotin compound of the structure:

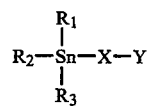

where X is O and Y is H or

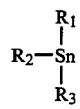

where $R_1$, $R_2$ and $R_3$ are alkyl.

2. The composition of claim 1 in which $R_1$, $R_2$ and $R_3$ are alkyl having 1 to 10 carbon atoms.

3. The composition of claim 2 in which $R_1$, $R_2$ and $R_3$ are butyl.

4. The composition of claim 1 in which the triorganotin compound is of the structure:

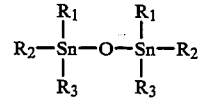

where $R_1$, $R_2$ and $R_3$ are alkyl.

5. The composition of claim 4 in which $R_1$, $R_2$ and $R_3$ are alkyl having 1 to 10 carbon atoms.

6. The composition of claim 5 in which $R_1$, $R_2$ and $R_3$ are butyl.

7. A method of coating an electrically conductive surface serving as an electrode in an electrical circuit comprising said electrode and a counter electrode of opposite polarity immersed in an aqueous electrodepositable composition, said method comprising passing electric current between the electrodes to cause the electrocoating composition to deposit on one of the electrodes to form a substantially continuous film and heating the electrodeposited film at elevated temperatures to cure the film, characterized in that the electrodepositable composition is that of claim 1.

* * * * *